US012804754B2

(12) United States Patent
Yamamoto

(10) Patent No.: US 12,804,754 B2
(45) **Date of Patent: *Nov. 17, 2026**

(54) COMMUNICATION APPARATUS, METHOD FOR CONTROLLING COMMUNICATION APPARATUS AND NON-TRANSITORY COMPUTER-READABLE STORAGE MEDIUM

(71) Applicant: CANON KABUSHIKI KAISHA, Tokyo (JP)

(72) Inventor: Tetsuya Yamamoto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 329 days.

This patent is subject to a terminal disclaimer.

(21) Appl. No.: 18/748,305

(22) Filed: Jun. 20, 2024

(65) Prior Publication Data

US 2024/0340987 A1 Oct. 10, 2024

Related U.S. Application Data

(63) Continuation of application No. 18/314,943, filed on May 10, 2023, now Pat. No. 12,048,041, which is a (Continued)

(30) Foreign Application Priority Data

Mar. 26, 2019 (JP) ................................ 2019-058903

(51) Int. Cl.
*H04W 4/00* (2018.01)
*H04W 36/00* (2009.01)

(Continued)

(52) U.S. Cl.
CPC ....... *H04W 76/15* (2018.02); *H04W 36/0069* (2018.08); *H04W 76/27* (2018.02); *H04W 88/06* (2013.01)

(58) Field of Classification Search
CPC . H04W 76/15; H04W 88/06; H04W 36/0069; H04W 76/27; H04W 72/04; H04W 76/10; H04W 76/16; H04W 36/00

(Continued)

(56) References Cited

U.S. PATENT DOCUMENTS 9,235,683 B2 * 1/2016 Robertson .............. G16H 15/00
9,398,480 B2 * 7/2016 Siomina ............... H04B 17/328

(Continued)

FOREIGN PATENT DOCUMENTS

JP 2017505057 A 2/2017
JP 2017195471 A 10/2017

(Continued)

OTHER PUBLICATIONS

3rd Generation Partnership Project; Technical Specification Group Radio Access Network; Evolved Universal Terrestrial Radio Access (E-UTRA) and NR; Multi-connectivity; Stage 2 (Release 15) (3GPP TS 37.340 V15.4.0). Dec. 2018: 1-67.

(Continued)

*Primary Examiner* — Marceau Milord
(74) *Attorney, Agent, or Firm* — ROSSI, KIMMS & McDOWELL LLP

(57) ABSTRACT

A communication apparatus capable of communicating with a master base station and a secondary base station, after it is decided, in a case where a radio resource control (RRC) state of the apparatus is Inactive state, where the apparatus is disconnected in a physical layer and is connected in a logical layer, to cause the RRC state to transit from the Inactive state to Connected state, where the apparatus is connected in the physical layer and the logical layer, executes processing for connecting with the master base station and the secondary base station, and in a case where the processing for connecting with the master base station or the secondary base (Continued)

station fails, causes the RRC state to transit to Idle state, where the apparatus is connected in neither the physical layer nor the logical layer.

17 Claims, 7 Drawing Sheets

Related U.S. Application Data continuation of application No. 17/369,044, filed on Jul. 7, 2021, now Pat. No. 11,690,119, which is a continuation of application No. 16/823,515, filed on Mar. 19, 2020, now Pat. No. 11,089,646.

(51) Int. Cl.
*H04W 76/15* (2018.01)
*H04W 76/27* (2018.01)
*H04W 88/06* (2009.01)

(58) Field of Classification Search
USPC ................................ 370/329, 252, 254, 331
See application file for complete search history.

(56) References Cited

U.S. PATENT DOCUMENTS

| | | | | |
|---|---|---|---|---|
| 10,966,270 | B2 * | 3/2021 | Takahashi ............... | H04W 8/24 |
| 11,089,646 | B2 * | 8/2021 | Yamamoto ............ | H04W 76/15 |
| 11,310,703 | B2 | 4/2022 | Sakai | |
| 11,690,119 | B2 * | 6/2023 | Yamamoto ........ | H04W 36/0069 370/329 |
| 12,048,041 | B2 * | 7/2024 | Yamamoto ........ | H04W 36/0069 |
| 2013/0117696 | A1 * | 5/2013 | Robertson .............. | G16H 20/10 715/763 |
| 2014/0126403 | A1 * | 5/2014 | Siomina ............... | H04B 17/328 370/252 |
| 2014/0203950 | A1 | 7/2014 | Zdeblick | |
| 2015/0146599 | A1 | 5/2015 | Jha | |
| 2017/0318504 | A1 | 11/2017 | Zhang | |
| 2018/0084523 | A1 | 3/2018 | Uchiyama | |
| 2019/0320361 | A1 | 10/2019 | Uchiyama | |
| 2019/0349950 | A1 | 11/2019 | Takano | |
| 2020/0112853 | A1 | 4/2020 | Jiang | |
| 2020/0169922 | A1 | 5/2020 | Ozturk | |
| 2020/0228963 | A1 | 7/2020 | Furuichi | |
| 2020/0245391 | A1 * | 7/2020 | Yamamoto ............ | H04W 76/34 |
| 2020/0305225 | A1 | 9/2020 | Zhang | |
| 2020/0314931 | A1 * | 10/2020 | Yamamoto ........ | H04W 36/0069 |
| 2020/0374892 | A1 | 11/2020 | Kusashima | |
| 2020/0396764 | A1 | 12/2020 | Lin | |
| 2021/0084525 | A1 | 3/2021 | Takano | |
| 2021/0184733 | A1 | 6/2021 | Cao | |
| 2021/0185751 | A1 | 6/2021 | Nakajima | |
| 2021/0204356 | A1 | 7/2021 | Sakai | |
| 2021/0400532 | A1 | 12/2021 | Zhou et al. | |
| 2022/0046477 | A1 | 2/2022 | Kusashima et al. | |
| 2022/0210704 | A1 | 6/2022 | Sakai | |
| 2023/0284305 | A1 * | 9/2023 | Yamamoto ........ | H04W 36/0069 370/329 |

FOREIGN PATENT DOCUMENTS

| | | | | | |
|---|---|---|---|---|---|
| JP | 2018056865 | A | | 4/2018 | |
| WO | 2015115034 | A1 | | 8/2015 | |
| WO | WO-2017171919 | A1 | * | 10/2017 | ...... H04W 36/00222 |
| WO | WO-2020143471 | A1 | * | 7/2020 | ........ H04W 74/0833 |

OTHER PUBLICATIONS

Office Action issued in U.S. Appl. No. 16/823,451 mailed Apr. 13, 2021.
Notice of Allowance issued in U.S. Appl. No. 16/823,515 mailed Apr. 1, 2021.
Notice of Allowance issued in U.S. Appl. No. 16/823,451 mailed Dec. 21, 2021.
"State Transition from INACTIVE to IDLE for NR" InterDigital Communications. 3GPP TSG-RAN WG2 #97 R2-1701189. Feb. 2017: pp. 1-4. Internet<URL:https://www.3gpp.org/ftp/tsg_ran/WG2_RL2/TSGR2_97/Docs/R2-1701189.zip>.
"Data transmission in inactive state, option A vs. option B" Huawei, HiSilicon. 3GPP TSG-RAN WG2 #97 R2-1702058. Feb. 2017: pp. 1-6. Internet<URL:https://www.3gpp.org/ftp/tsg_ran/WG2_RL2/TSGR2_97/Docs/R2-1702058.zip>.
Office Action issued in U.S. Appl. No. 17/369,044 mailed on Sep. 16, 2022.
"Discussion on SCG resumption" CATT. 3GPP TSG-RAN WG2 #105 R2-1900206. Feb. 15, 2019.
Notice of Allowance issued in U.S. Appl. No. 17/369,044 mailed on Jan. 17, 2023.
Notice of Allowance issued in U.S. Appl. No. 17/369,044 mailed on Feb. 15, 2023.
InterDigital Inc. "Dual Connectivity Configuration in INACTIVE for MR-DC", 3GPP TSG-RAN WG2 Meeting #103, R2-1811461. 2018: pp. 1-5.
Vivo "Discussion on maintaining CA and DC configuration in RRC Inactive", 3GPP TSG-RAN WG2 Meeting #105, R2-1900264. 2019: pp. 1-3.
Office Action issued in U.S. Appl. No. 17/699,774 mailed Jun. 26, 2023.
"3GPP TSG-RAN WG2 #105", R2-1900206, Athens, Greece, Feb. 25-Mar. 1, 2019.
Notice of Allowance issued in U.S. Appl. No. 17/699,774, mailed Feb. 27, 2024.
Office Action issued in U.S. Appl. No. 18/314,943, mailed on Dec. 21, 2023.
Notice of Allowance issued in U.S. Appl. No. 18/314,943, mailed on Mar. 26, 2024.

* cited by examiner

COMMUNICATION APPARATUS, METHOD FOR CONTROLLING COMMUNICATION APPARATUS AND NON-TRANSITORY COMPUTER-READABLE STORAGE MEDIUM

BACKGROUND OF THE INVENTION

Field of the Invention

The present invention is related to a communication apparatus, a method for controlling a communication apparatus, and a non-transitory computer-readable storage medium.

Description of the Related Art

A 3GPP (3rd Generation Partnership Project) specification defines dual connectivity (DC), by which a plurality of base stations communicate simultaneously. In a DC state, user equipment (UE) can improve user throughput and reliability of communication by simultaneously communicating between a master node (MN) and a secondary node (SN) (Japanese Patent Laid-Open No. 2018-56865).

Further, in the 3GPP specification, conventionally, in Radio Resource Control (RRC), only two states (RRC_Idle in a disconnected state and RRC_Connected in a connected state) were defined. In relation to this, in a recent 3GPP specification, an RRC_Inactive state, in which a lower physical layer is in a non-connected state and an upper logical layer is in a connected state, is defined. By the definition of the RRC_Inactive state, it is possible to achieve both control signal suppression/power saving for a UE that does not need to standby and quick network connection upon a return to communication.

The current 3GPP specification does not specify the process (Resume process) for returning from RRC_Inactive to RRC_Connected in the DC state. For example, consider a case where a UE successfully returns to RRC_Connected in a connection with a master node (MN) and fails to return to RRC_Connected in a connection with a secondary node (SN). If the UE only maintains the communication with the MN that returned successfully, there is the risk that the detection of the failure to return for the SN will be delayed, and SN resources will be consumed unnecessarily until it is detected that the return for the SN failed.

SUMMARY OF THE INVENTION

In view of the above problem, the present disclosure provides a technique by which unnecessary consumption of resources in a dual connectivity (DC) state is suppressed.

According to one aspect of the present invention, there is provided a communication apparatus capable of communicating with a master base station and a secondary base station, the apparatus comprises: an RRC state control unit configured to control a radio resource control (RRC) state of the communication apparatus; and a connection control unit configured to execute connection processing in relation to each of the master base station and the secondary base station, wherein after it is decided, in a case where the RRC state of the communication apparatus is Inactive state, where the communication apparatus is disconnected in a physical layer and is connected in a logical layer, to cause the RRC state to transit from the Inactive state to Connected state, where the communication apparatus is connected in the physical layer and the logical layer, in a case where processing in which the connection control unit connects with the master base station or the secondary base station fails, the RRC state control unit causes the RRC state to transit to Idle state, where the communication apparatus is connected in neither the physical layer nor the logical layer.

Further features of the present invention will become apparent from the following description of exemplary embodiments (with reference to the attached drawings).

DESCRIPTION OF THE EMBODIMENTS

Figure 1:
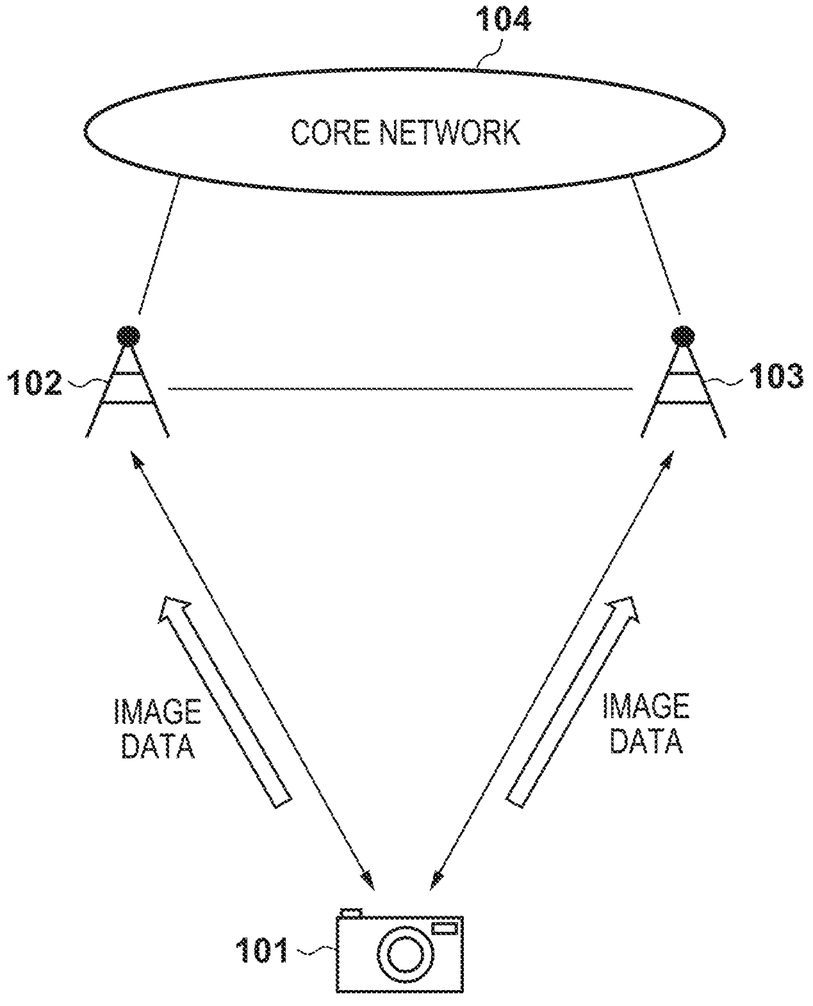
FIG. 1 shows an example of a network configuration.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment (Network Configuration)

FIG. 1 shows an example of a network configuration according to the present embodiment. The network is configured by a digital camera 101 and base stations 102 and 103. The digital camera 101 supports dual connectivity (DC) communication by which it simultaneously communicates with the base station 102 and the base station 103. For example, the digital camera 101 performs DC communication with the base station 102 and the base station 103 to transmit image data, which is obtained by an image capturing process, in order to upload the image data to a server (not shown). The base stations 102 and 103 transmit the captured image data received from the digital camera 101 to a network device such as a superordinate station or a server communicatively connected to a core network 104.

In the present embodiment, it is assumed that the base station 102 functions as a master node (MN) base station (master base station), and the base station 103 functions as a secondary node (SN) base station (secondary base station). In DC communication, the base station 102, which is the MN base station, controls the DC communication between the digital camera 101 and the base station 102 and the base station 103, and controls the communication with the core network 104.

(Digital Camera Configuration)

Figure 2:
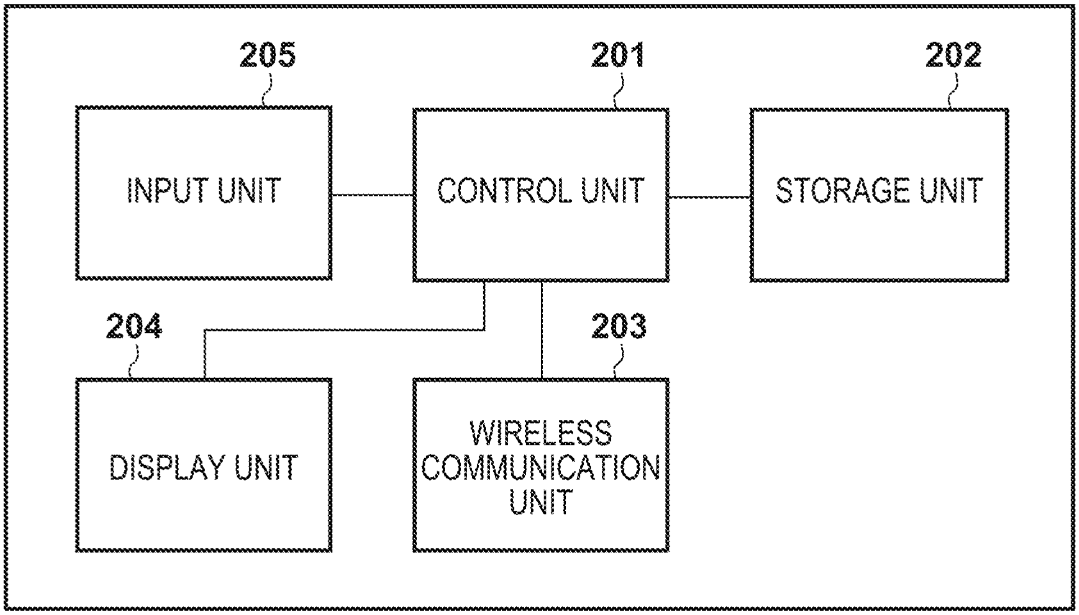
FIG. 2 shows an example of a hardware configuration of a communication apparatus.

FIG. 2 shows an example of a hardware configuration of the digital camera 101 according to the present embodiment. The digital camera 101 has, for example, a control unit 201, a storage unit 202, a wireless communication unit 203, a display unit 204, and an input unit 205 as its hardware configuration.

The control unit 201 controls the entire apparatus by executing a control program stored in the storage unit 202. The storage unit 202 stores a control program executed by the control unit 201 and various information such as communication parameters and captured image data. Various operations to be described later are performed by the control unit 201 executing a control program stored in the storage unit 202. The wireless communication unit 203 controls transmission and reception of signals for performing cellular network communication, such as LTE (Long Term Evolution) and 5G (5th Generation) communications conforming to a 3GPP standard. The display unit 204 has a function for outputting visual information. The display unit 204 may be configured to output sound information, and may have a function by which it is possible to output visually perceivable information, as does an LCD or an LED, or for outputting sound as with a speaker, for example. The input unit 205 is an input unit through which a user performs various inputs and the like. The input unit 205 may be further configured to obtain various information (sensor information) obtained by a sensor (not shown).

Figure 3:
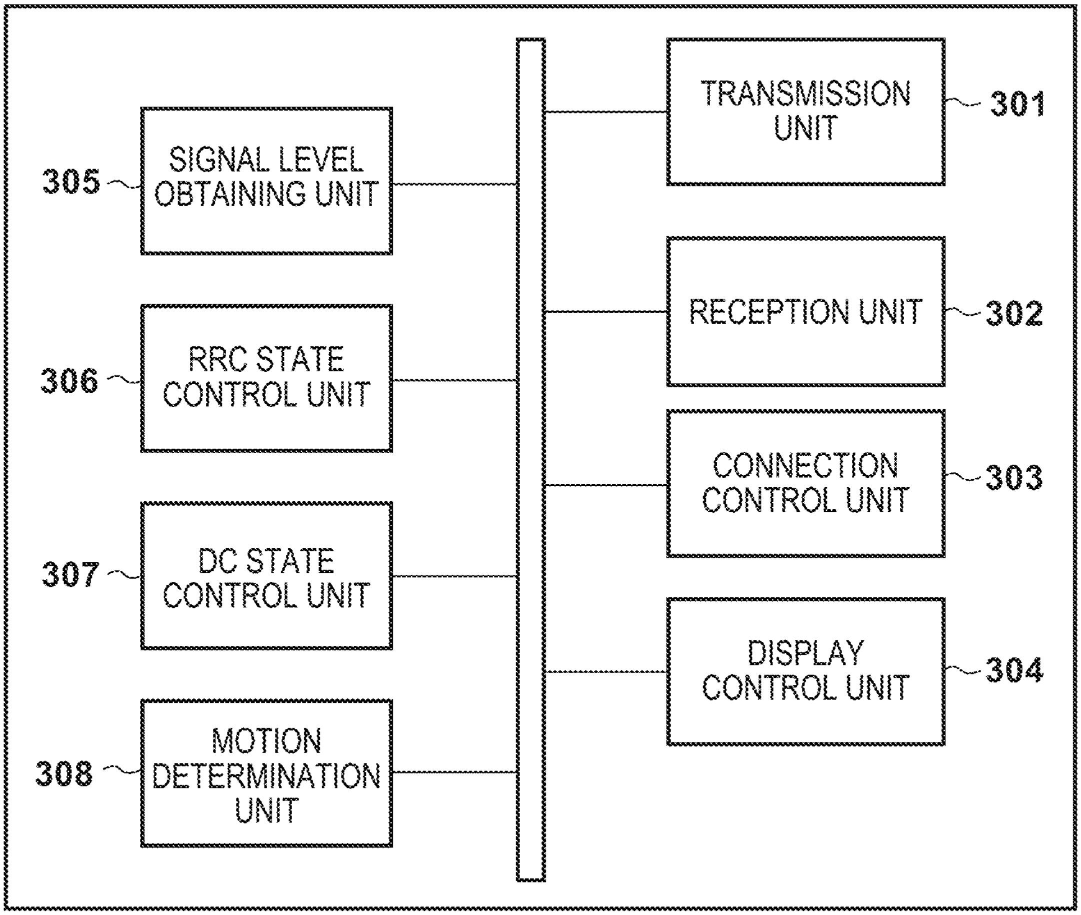
FIG. 3 illustrates an example of a functional configuration of the communication apparatus.

FIG. 3 is a diagram showing an example of a functional configuration of the digital camera 101. The functional configuration of the digital camera 101 includes a transmission unit 301, a reception unit 302, a connection control unit 303, a display control unit 304, a signal level obtaining unit 305, an RRC state control unit 306, a DC state control unit 307, and a motion determination unit 308.

The transmission unit 301 and the reception unit 302 respectively perform a signal transmitting process and a signal receiving process via the wireless communication unit 203 (FIG. 2). The connection control unit 303 performs processing relating to connection and disconnection with the base station. In addition, the connection control unit 303 performs setting processing related to DC communication with the base station. The display control unit 304 performs output control on the display unit 204. The signal level obtaining unit 305 obtains a signal strength (dBm) such as an RSSI (Received Signal Strength Indication) of a signal from a communication apparatus (such as a base station) located in a periphery of the digital camera 101 as a received signal level. In the present embodiment, the signal level obtaining unit 305 may be configured to obtain the received signal level when the control unit 201 determines that DC communication is necessary. For example, the signal level obtaining unit 305 may be configured to obtain the received signal level when the control unit 201 determines that a data communication application, which is determined in advance to require cellular communication including the DC communication, is being executed. That is, configuration may be taken such that the signal level obtaining unit 305 obtains the received signal level when the application is being executed, and does not obtain the received signal level when the application is not being executed. The signal level obtaining unit may obtain reception sensitivity/quality such as a signal to interference plus noise ratio (SINR) or a signal to noise ratio (SNR) as the received signal level.

The RRC state control unit 306 controls an RRC control state according to the digital camera 101. As described above, the RRC control state includes an RRC_Connected state (connected state), an RRC_Inactive state (disconnected state in a lower physical layer and connected state in an upper logical layer), and an RRC_Idle state (disconnected state). The DC state control unit 307 controls the switching of the digital camera 101 into a state (DC state) in which dual connection with the MN base station and the SN base station (connection by DC) can be performed or a state in which such a dual connection cannot be performed (non-DC state). The motion determination unit 308 determines whether or not the digital camera 101 is in a stationary state based on sensor information input to the input unit 205.

(Processing Flow)

Figure 4:
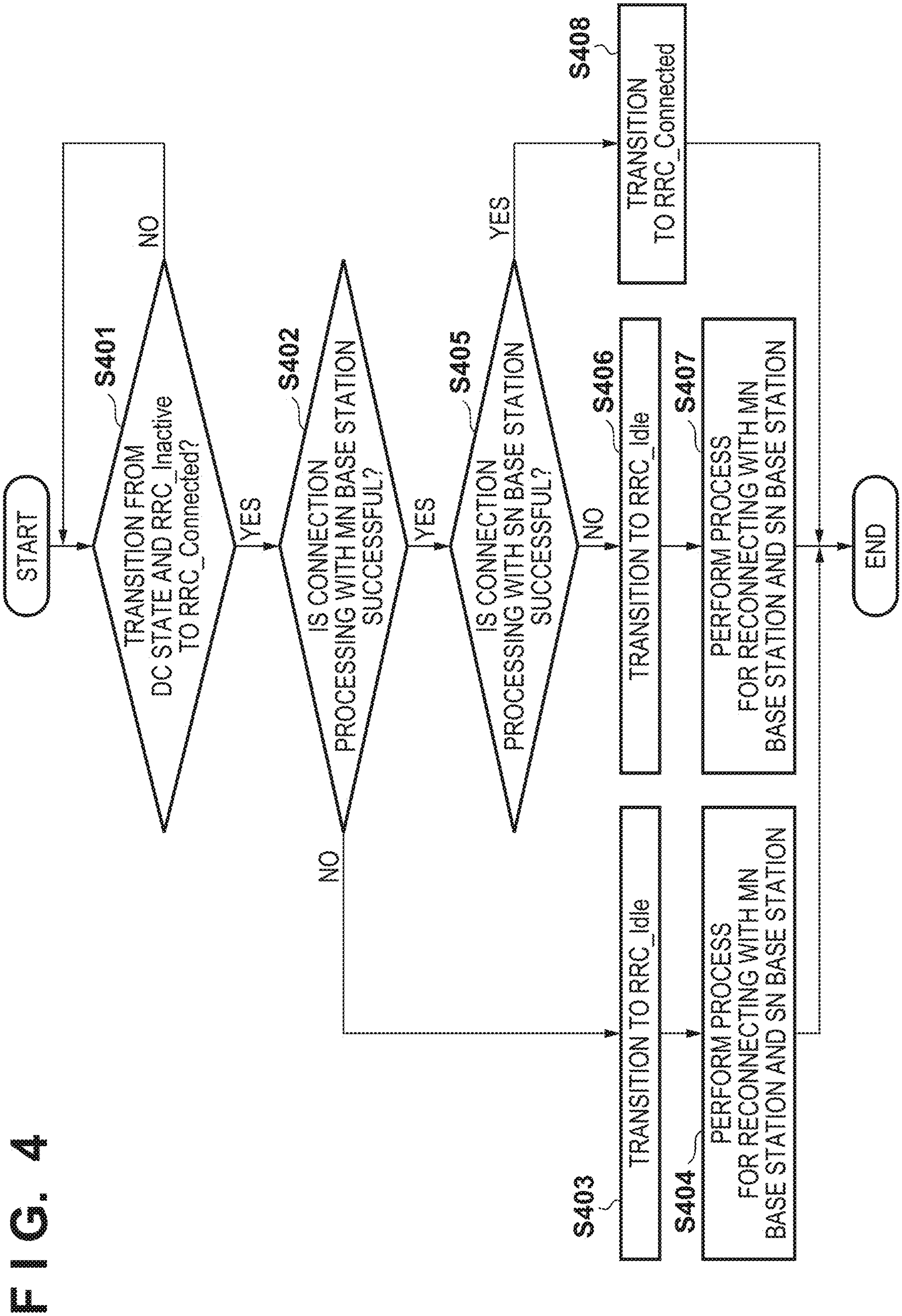
FIG. 4 is a flowchart showing processing performed by a UE in the first embodiment.

FIG. 4 is a flowchart illustrating processing executed in the digital camera 101 in the present embodiment. The flowchart of FIG. 4 shows a process in which the digital camera 101 in the DC state transits from the RRC_Inactive state to a state in which communication can be performed (RRC_Connected). The flowchart shown in FIG. 4 can be performed by the control unit 201 reading and executing a computer program stored in the storage unit 202.

First, the RRC state control unit 306 determines whether to cause the RRC state of the digital camera 101 to transit from the RRC_Inactive state to the RRC_Connected state (step S401). For example, the RRC state control unit 306 decides to transit the RRC state from the RRC_Inactive state to RRC_Connected in the DC state when the amount of data to be transmitted to the network (image data to be uploaded) of the digital camera 101 exceeds a predetermined amount. Note that the RRC state control unit 306 may decide to transit the RRC state from the RRC_Inactive state to RRC_Connected in the DC state in response to an operation by the user via the input unit. At this time, the user may perform the operation based on the information displayed on the display unit 204. In the case of a transit from the RRC_Inactive state to RRC_Connected in the DC state (YES in step S401), the process proceeds to step S402, otherwise, the process returns to step S401.

In step S402, the connection control unit 303 tries connection processing (Resume processing) with RRC_Connected in the connection with the MN base station, and determines whether or not the connection processing is successful. The connection process may be successful when, for example, the radio wave environment (communication state) between the digital camera 101 and the target base station is good. Therefore, for example, in the digital camera 101, when the received signal level for the signal from the target base station is equal to or lower than a predetermined level, the connection process may fail. When the connection process with the MN base station is not successful (No in step S402), the RRC state control unit 306 causes the RRC state of the digital camera 101 to transit to RRC_Idle (step S403). Subsequently, the connection control unit 303 performs a process for reconnecting with the MN base station and the SN base station for the DC communication (step S404). When the connection processing with the MN base station has succeeded (YES in step S402), the connection control unit 303 further attempts the connection processing with the SN base station, and determines whether or not the connection processing has succeeded (step S405). When the connection process with the SN base station is not successful (NO in step S405), the RRC state control unit 306 causes the RRC state of the digital camera 101 to transit to RRC_Idle (step S406). Subsequently, the connection control unit 303 performs a process for reconnecting with the MN base station and the SN base station for the DC communication (step S407). When the connection process with the SN base station is successful (YES in step S405), the RRC state control unit 306 causes the RRC state of the digital camera 101 to transit to RRC_Connected (step S408).

Thus, in the present embodiment, when the digital camera 101 transits from the RRC_Inactive state to RRC_Connected in the DC state, if the connection processing with the MN base station and the SN base station is not successful, the RRC_Idle state is entered. As a result, unnecessary consumption of resources in the DC state can be suppressed, and the resources of the SN base station can be effectively utilized.

Second Embodiment

In the second embodiment, when the digital camera 101 transits from the RRC_Connected state to the RRC_Inactive state, the state control of the digital camera 101 is performed in accordance with the state of communication with the SN base station. The corresponding state control leads to control by which it is possible to avoid failure of the processing for connecting with the SN base station (step S405) when the digital camera 101 transits from the RRC_Inactive state to the RRC_Connected state in the DC state, as in the first embodiment. Note that in the following, description will be given for points different from the first embodiment, and description of common portions will be omitted.

Figure 5:
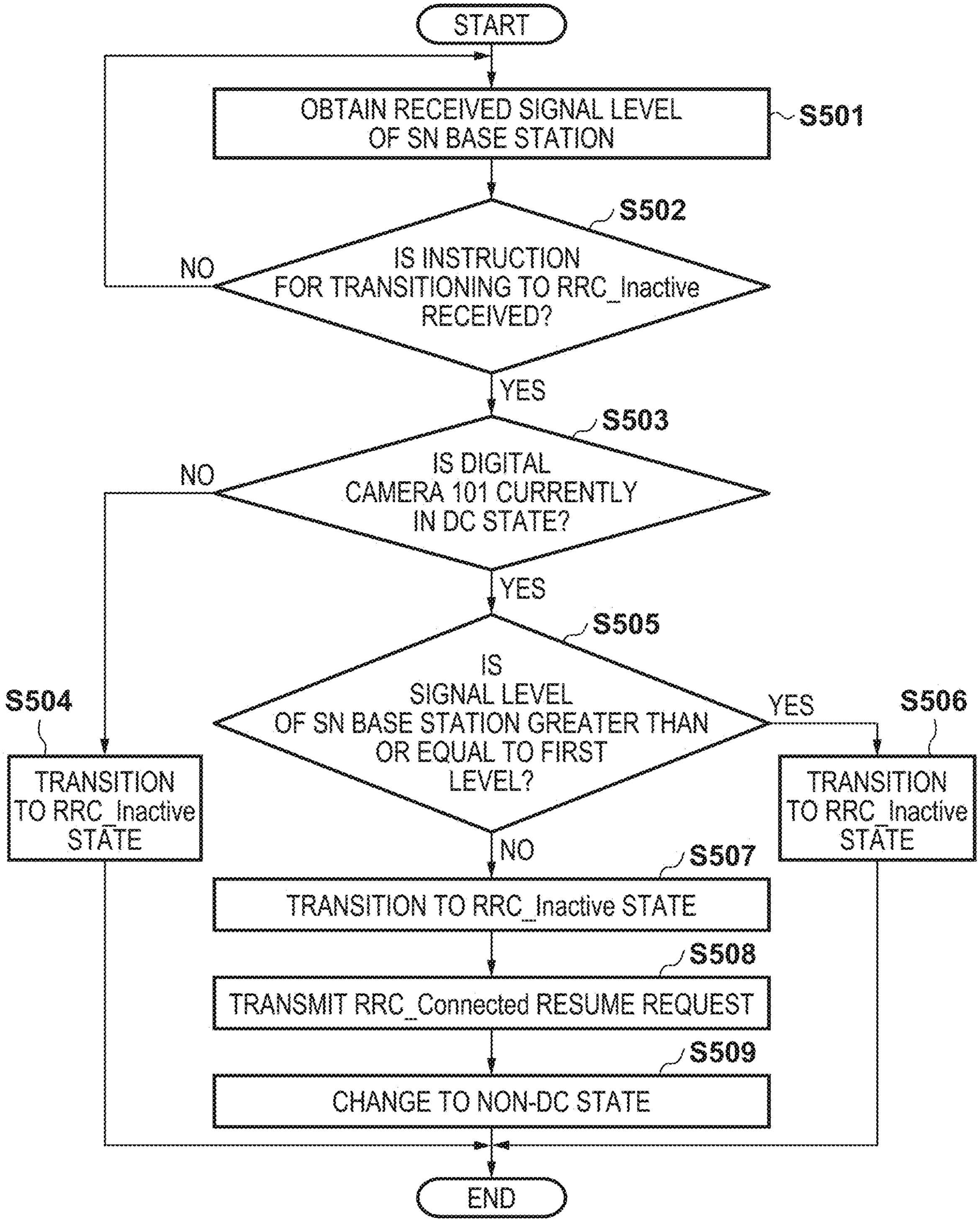
FIG. 5 is a flowchart showing processing performed by the UE in a second embodiment.

FIG. 5 is a flowchart illustrating processing executed in the digital camera 101 in the present embodiment. The flowchart of FIG. 5 shows a process in which the digital camera 101 in the DC state transits from the RRC_Inactive state to the RRC_Connected state. The flowchart shown in FIG. 5 can be performed by the control unit 201 reading and executing a computer program stored in the storage unit 202.

First, the signal level obtaining unit 305 obtains the received signal level of the signal from the SN base station (step S501). The signal level obtaining unit 305 measures the reception level of the signal received from the SN base station via the reception unit 302 in a period of, for example, 5 seconds, and calculates an average value as the received signal level. Alternatively, a received signal level obtained in advance by the signal level obtaining unit 305 and held in the storage unit 202 may be used. Next, the reception unit 302 determines whether or not an instruction for transiting to the RRC_Inactive state has been received from the MN base station (step S502). Note that the reception unit 302 may determine whether an instruction for transiting to RRC_Inactive has been received by, for example, a user's input to the input unit 205. If an instruction to transit to the RRC_Inactive state has not been received (NO in step S502), the process returns to step S501. When an instruction to transit to RRC_Inactive is received (YES in step S502), the DC state control unit 307 determines whether the digital camera 101 is currently in the DC state (step S503). When the digital camera 101 is not in the DC state (NO in step S503), the RRC state control unit 306 causes the RRC state of the digital camera 101 to transit to the RRC_Inactive state. (step S504).

When the digital camera 101 is in the DC state (YES in step S503), the RRC state control unit 306 determines whether the received signal level of the SN base station obtained in step S501 is greater than or equal to a predetermined first level (step S505). An example of a first level is −85 dBm, but there is no limitation to this number. When the received signal level of the SN base station is a first level or higher (YES in step S505), the RRC state control unit 306 causes the RRC state of the digital camera 101 to transit to the RRC_Inactive state. (step S506). When the received signal level of the SN base station is not the first level or higher (NO in step S505), the RRC state control unit 306 causes the RRC state of the digital camera 101 to transit to the RRC_Inactive state (step S507). Subsequently, the connection control unit 303 transmits a request to resume RRC_Connected (Resume request) to the MN base station via the transmission unit 301 (step S508). When the RRC_Connected resume process between the digital camera 101 and the MN base station is completed, the RRC state control unit 306 causes the RRC state of the digital camera 101 to transit to the RRC_Connected state.

After the digital camera 101 transits to the RRC_Connected state, the DC state control unit 307 changes the DC state of the digital camera 101 to the DC disabled state (non-DC state) (step S509). In response to this change to the non-DC state, the transmission unit 301 may transmit capability information of the digital camera 101 including information indicating that DC cannot be performed with respect to the MN base station. Further, the transmission unit 301 may transmit capability information of the digital camera 101 to the MN base station including at least information indicating connection with the MN base station (such as a connection only with the MN base station) in response to the change to the non-DC state.

As described above, in the present embodiment, the digital camera 101 enters the RRC_Inactive state when the communication state with the SN base station is good. Further, since the digital camera 101, when the communication state of the SN base station is not good, enters the non-DC state, there ceases to be frequent switching between the DC state and the non-DC state, and communication is stabilized.

Third Embodiment

In the third embodiment, similarly to in the second embodiment, state control is performed for the digital camera 101 in accordance with the state of communication with the SN base station in the case where the digital camera 101 transits from the RRC_Connected state to the RRC_Inactive state. Note that in the following, description will be given for points different from the first and second embodiments, and description of common portions will be omitted.

Figure 6:
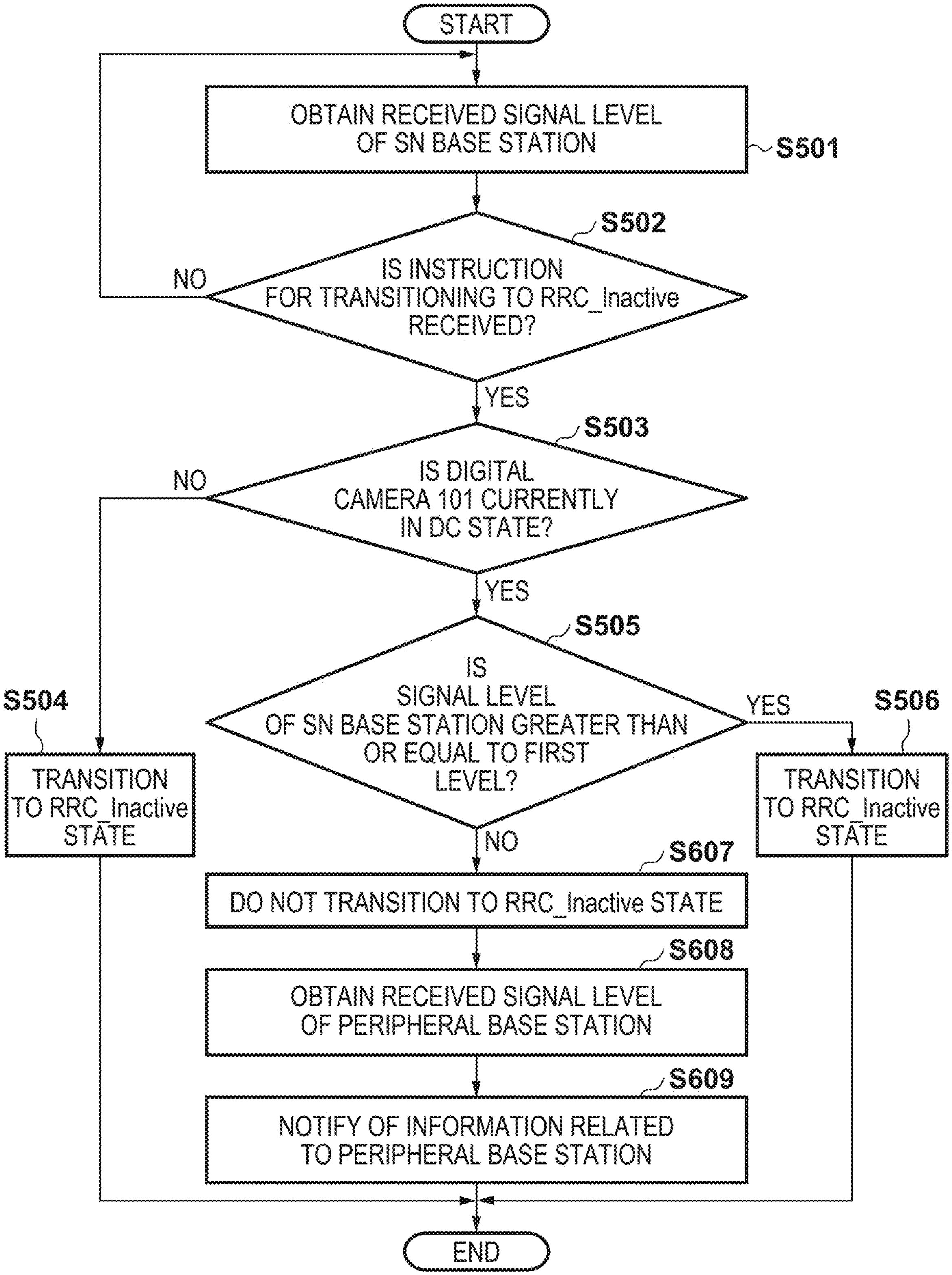
FIG. 6 is a flowchart showing processing performed by the UE in a third embodiment.

FIG. 6 is a flowchart illustrating processing executed in the digital camera 101 in the present embodiment. The flowchart of FIG. 6 shows a process in which the digital camera 101 transits from the RRC_Connected state to the RRC_Inactive state. The flowchart shown in FIG. 6 can be performed by the control unit 201 reading and executing a computer program stored in the storage unit 202.

In FIG. 6, the processing of step S501, step S502, step S503, step S504, step S505, and step S506 is the same as the processing of the same reference numbers in FIG. 5 described in the second embodiment. When, in step S505, the received signal level of the SN base station is not the predetermined first level or higher (NO in step S505), the RRC state control unit 306 does not cause the RRC state of the digital camera 101 to transit to the RRC_Inactive state (step S607). As a result, the digital camera 101 maintains the RRC_Connected state. Next, the signal level obtaining unit 305 obtains a received signal level of a signal received from one or more base stations (peripheral base stations) located in a periphery of the digital camera 101 via the reception unit 302 (step S608). After that, the transmission unit 301 notifies the MN base station of the information of the received signal levels of the peripheral base stations as peripheral base station information (step S609). As a result, when there is an SN base station whose communication state is better than the currently connected SN base station, the digital camera 101 prompts the MN base station to switch to the SN base station whose communication state is better. The peripheral base station information may include information on the received signal levels of the SN base stations obtained in step S501.

As described above, in the present embodiment, the digital camera 101 enters the RRC_Inactive state when the communication state with the SN base station is good. In addition, when the communication state of the SN base station is not good, the digital camera 101 attempts to switch to the SN base station whose communication state is better, thereby increasing the possibility of stable communication.

Fourth Embodiment

In the fourth embodiment, similarly to in the second and third embodiments, state control is performed for the digital camera 101 in accordance with the state of communication with the SN base station in the case where the digital camera 101 transits from the RRC_Connected state to the RRC_Inactive state. Note that in the following, description will be given for points different from the first, second and third embodiments, and description of common portions will be omitted.

Figure 7:
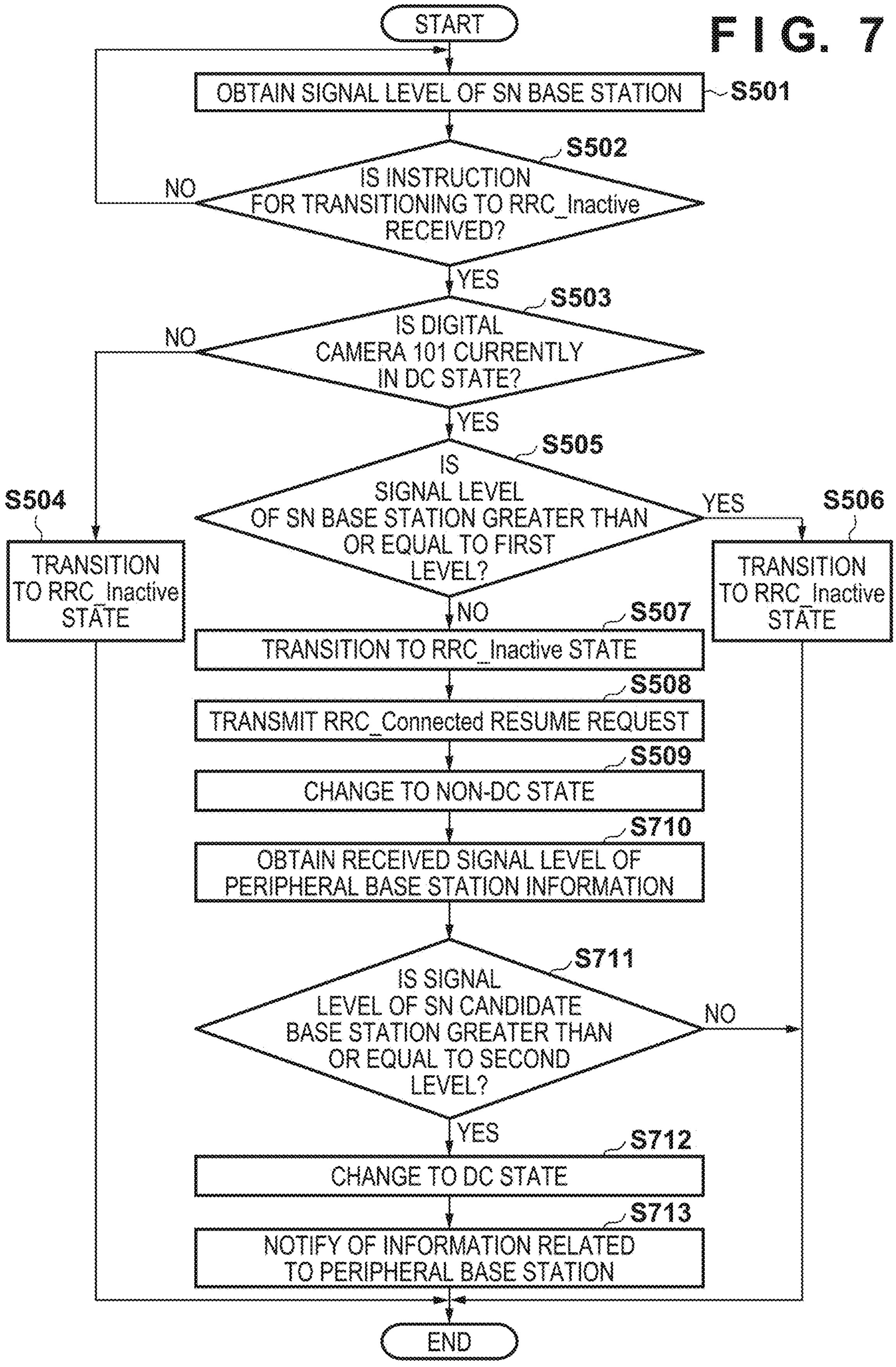
FIG. 7 is a flowchart showing processing performed by the UE in a fourth embodiment.

FIG. 7 is a flowchart illustrating processing executed in the digital camera 101 in the present embodiment. The flowchart of FIG. 7 shows a process in which the digital camera 101 transits from the RRC_Connected state to the RRC_Inactive state. The flowchart shown in FIG. 7 can be performed by the control unit 201 reading and executing a computer program stored in the storage unit 202.

In FIG. 7, the processing of step S501, step S502, step S503, step S504, step S505, step S506, step S507, step S508, and step S509 is the same as the processing of the same reference numbers in FIG. 5 described in the second embodiment. After the DC state control unit 307, in step S509, changes the DC state of the digital camera 101 to a state in which DC cannot be performed (non-DC state), the signal level obtaining unit 305 obtains received signal levels of peripheral base stations (step S710). Next, the DC state control unit 307 determines whether a received signal level obtained in step S710 is a predetermined second level (step S711). An example of the second level is-80 dBm, but there is no limitation to this number. When none of the received signal levels of the peripheral base stations are equal to or higher than the second level (NO in step S711), the DC state control unit 307 maintains the non-DC state of the digital camera 101 and ends the process. When there is a base station (a candidate SN base station), among the peripheral base stations, whose received signal level is equal to or higher than the second level (YES in step S711), the DC state control unit 307 changes the digital camera to a state in which DC can be performed (DC state) (step S712). Note that when there are a plurality of SN candidate base stations, the display control unit 304 may display information on the plurality of SN candidate base stations on the display unit 204, and the user may select one SN candidate base station. The transmission unit 301 may, having received the change to the DC state, transmit capability information of the digital camera 101 including information indicating that DC can be performed to the MN base station. In response to this change to the DC state, the transmission unit 301 may transmit to the MN base station capability information of the digital camera 101 including information indicating that connection with the SN base station can be performed. Next, the transmission unit 301 notifies the MN base station of the information of the received signal levels of the peripheral base stations including SN candidate base station as peripheral base station information (step S713). As a result, when there is an SN base station whose communication state is better than the currently connected SN base station, the digital camera 101 prompts the MN base station to switch to the SN base station whose communication state is better. Note that the peripheral base station information may include information on the received signal levels of the SN base stations obtained in step S501.

As described above, in the present embodiment, the digital camera 101 enters the RRC_Inactive state when the communication state with the SN base station is good. Further, since the digital camera 101, when the communication state of the SN base station is not good, enters the non-DC state, there ceases to be frequent switching between the DC state and the non-DC state, and communication is stabilized. In addition, when the communication state of an SN base station is not good, the digital camera 101 attempts to switch to an SN base station whose communication state is better, thereby increasing the possibility of stable communication.

Fifth Embodiment

Figure 8:
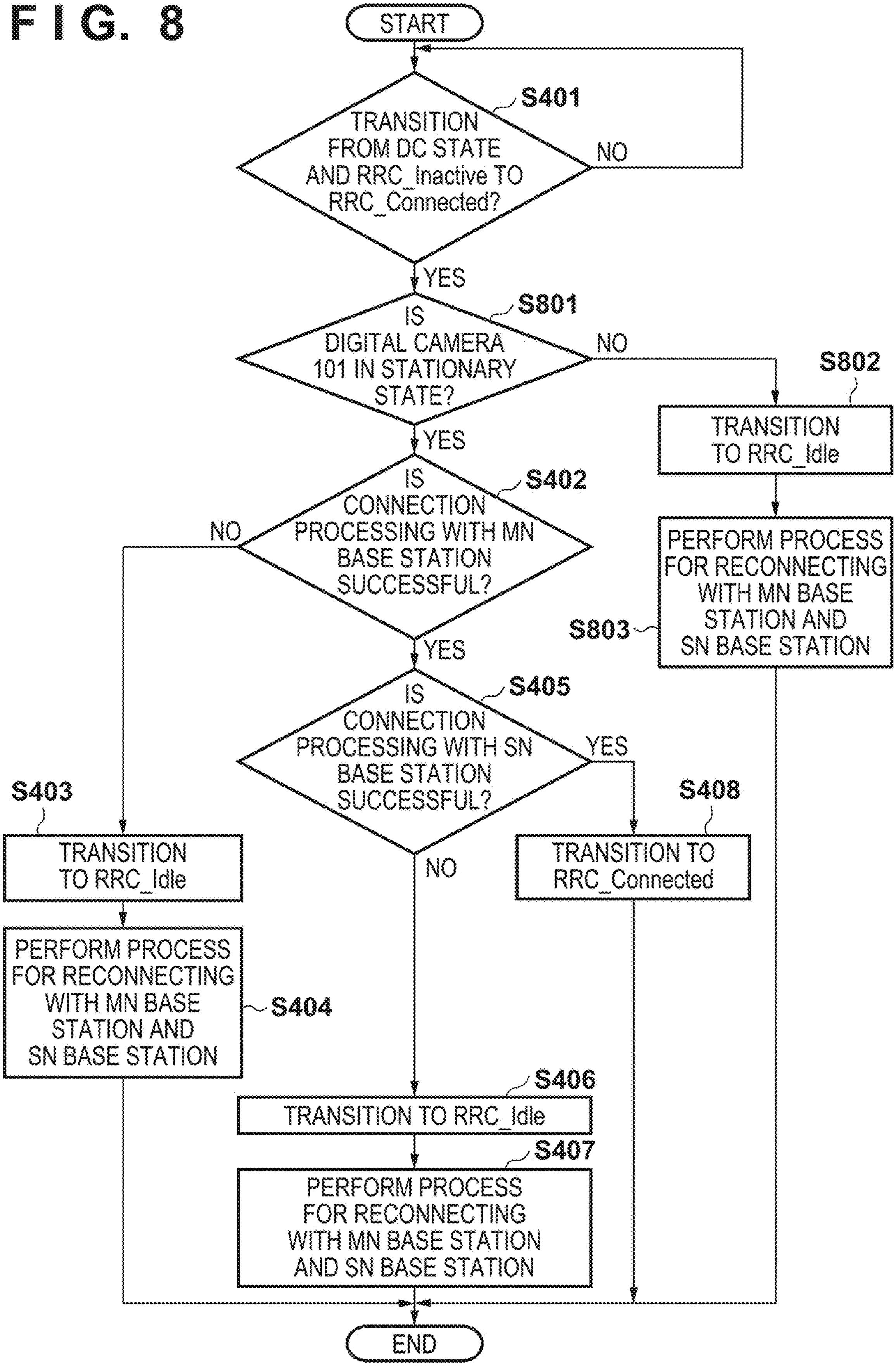
FIG. 8 is a flowchart showing processing performed by the UE in a fifth embodiment.

In the fifth embodiment, an embodiment that is different to the first embodiment and in which the digital camera 101 in the DC state transits from the RRC_Inactive state to a state in which communication can be performed (RRC_Connected) will be described. Note that in the following, description will be given for points different from the first embodiment, and description of common portions will be omitted. FIG. 8 is a flowchart illustrating processing executed in the digital camera 101 in the present embodiment. The flowchart shown in FIG. 8 can be performed by the control unit 201 reading and executing a computer program stored in the storage unit 202.

In FIG. 8, the processing of step S401, step S402, step S403, step S404, step S405, step S406, step S407, and step S408 is the same as the processing of the same reference numbers in FIG. 4 described in the first embodiment. The RRC state control unit 306 determines whether to cause the RRC state of the digital camera 101 to transit from the RRC_Inactive state to the RRC_Connected state (step S401). In the case of a transition from the RRC_Inactive state to RRC_Connected in the DC state (YES in step S401), the process proceeds to step S801, otherwise, the process returns to step S401. In step S801, the motion determination unit 308 determines whether the digital camera 101 is in a stationary state (a stationary state or a moving state). If the digital camera 101 is in a stationary state (YES in step S801), the process proceeds to step S402. When the digital camera 101 is in a moving state (NO in step S801), the RRC state control unit 306 determines that the digital camera 101 is likely to move out of a range in which it can communicate with the MN base station and the SN base station that had been thus far connected. Then, the RRC state control unit 306 causes the RRC state of the digital camera 101 to transit to the RRC_Idle state (step S802). Subsequently, the connection control unit 303 performs a process for reconnecting with the MN base station and the SN base station for the DC communication (step S803).

Thus, in the present embodiment, when the digital camera 101 is not in a stationary state and is determined to be likely to move out of range of the connected MN base station or SN base station, the digital camera 101 skips the process for determining the connections (step S402 and step S405) with the two base stations. As a result, this enables a quick reconnection process.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-058903 filed Mar. 26, 2019, which is hereby incorporated by reference herein in its entirety.

What is claimed is:

1. A communication apparatus capable of communicating with a master base station and a secondary base station, comprising:

one or more processors; and one or more memories including instructions that, when executed by the one or more processors, cause the communication apparatus to:

perform connection processing in relation to each of the master base station and the secondary base station, after a radio resource control (RRC) state of the communication apparatus transits to an RRC Inactive state, cause the RRC state to transit from the RRC Inactive state to an RRC Connected state, in a case where connection with the master base station fails as a result of the connection processing, cause the RRC state to transit to an RRC Idle state, and transmit, to an external apparatus, first capability information indicating that the communication apparatus is unable to perform communication using a Dual Connectivity technology in a case where the communication apparatus is in a predetermined state.

2. The communication apparatus according to claim 1, wherein the instructions, when executed by the one or more processors, further cause the communication apparatus to:

transmit, to an external apparatus, second capability information indicating that the communication apparatus is able to perform communication according to Dual Connectivity in a case where the communication apparatus is in a second state different from the predetermined state.

3. The communication apparatus according to claim 1, wherein the connection processing in relation to each of the master base station and the secondary base station is connection processing using a Dual Connectivity technology, wherein in a case where the communication apparatus is in the predetermined state and transmitted the capability information to the external apparatus, the connection processing using the Dual Connectivity technology is not performed by the communication apparatus in the connection processing.

4. The communication apparatus according to claim 1, wherein the RRC state is determined to be caused to transit from the RRC Inactive state to the RRC Connected state in response to an operation by a user.

5. The communication apparatus according to claim 1, wherein the RRC state is determined to be caused to transit from the RRC Inactive state to the RRC Connected state in accordance with an amount of data to be transmitted by the communication apparatus.

6. The communication apparatus according to claim 1, wherein the instructions, when executed by the one or more processors, further cause the communication apparatus to:

perform communications conforming to a 3GPP standard.

7. The communication apparatus according to claim 6, wherein the communications conforming to a 3GPP standard include Long Term Evolution (LTE) communications.

8. The communication apparatus according to claim 6, wherein the communications conforming to a 3GPP standard include 5th Generation (5G) communications.

9. The communication apparatus according to claim 1, wherein the communication apparatus is a digital camera apparatus.

10. The communication apparatus according to claim 1, wherein the communication apparatus transmit image data which is obtained by an image capturing process, to an external apparatus via the master base station and/or the secondary base station.

11. The communication apparatus according to claim 1, wherein the RRC Idle state is a disconnected state.

12. The communication apparatus according to claim 11, wherein the RRC Inactive state is a state that is characterized by both power saving of an UE (User Equipment) and quick network connection upon a return to communication.

13. The communication apparatus according to claim 11, wherein the RRC Inactive state is a state in which power consumption is saved compared to the power consumption in the RRC connected state, and a state in which a connection time upon the return to communication is shorten compared to the connection time in the RRC Idle state.

14. A communication apparatus capable of communication with a master base station and a secondary base station using a Dual Connectivity technology comprising:

one or more antennas;

one or more processors;

one or more memories including instructions that, when executed by the one or more processors, cause the communication apparatus to:

transmit, to an external apparatus via at least one of the one or more antennas, capability information indicating that the communication apparatus is unable to perform communication using the Dual Connectivity technology in a case where the communication apparatus is in a predetermined state.

15. The communication apparatus according to claim 14, wherein the instructions, when executed by the one or more processors, further cause the communication apparatus to:

Transmit, to the external apparatus via at least one of the one or more antennas, second capability information indicating that the communication apparatus is able to perform communication using the Dual Connectivity technology in a case where the communication apparatus is in a second state different from the predetermined state.

16. A control method of a communication apparatus capable of communicating with a master base station and a secondary base station, the method comprising:

transmitting, to an external apparatus, first capability information indicating that the communication apparatus is unable to perform communication using a Dual Connectivity technology in a case where the communication apparatus is in a predetermined state; and transmitting, to an external apparatus, second capability information indicating that the communication apparatus is able to perform communication according to Dual Connectivity in a case where the communication apparatus is in a second state different from the predetermined state.

17. A non-transitory computer-readable storage medium storing a computer program for causing a computer to execute method for controlling a communication apparatus capable of communicating with a master base station and a secondary base station, the method comprising:

transmitting, to an external apparatus, first capability information indicating that the communication apparatus is unable to perform communication using a Dual Connectivity technology in a case where the communication apparatus is in a predetermined state; and transmitting, to an external apparatus, second capability information indicating that the communication apparatus is able to perform communication according to Dual Connectivity in a case where the communication apparatus is in a second state different from the predetermined state.

* * * * *